United States Patent [19]

Miele

[11] Patent Number: 4,964,485
[45] Date of Patent: Oct. 23, 1990

[54] BACK-UP SAFETY DEVICE AND METHOD
[75] Inventor: Joseph R. Miele, West Nyack, N.Y.
[73] Assignee: BackStop, Inc., Northvale, N.J.
[21] Appl. No.: 339,818
[22] Filed: Apr. 18, 1989
[51] Int. Cl.⁵ .................................... B60T 7/12
[52] U.S. Cl. .................................... 180/275
[58] Field of Search ............ 303/2, 9, 13, 15, 20, 303/100; 188/2 R, 151; 192/0.072, 1.21; 180/270, 271, 274, 275; 293/5

[56] References Cited

U.S. PATENT DOCUMENTS

| | | | |
|---|---|---|---|
| 2,588,815 | 3/1952 | Fasolino | 180/275 |
| 3,853,199 | 12/1974 | Hirashima et al. | 180/274 |
| 3,882,955 | 5/1975 | Kaneko et al. | 180/270 |
| 3,901,556 | 8/1975 | Prillinger | 303/2 X |
| 3,986,577 | 10/1976 | Ebbesson et al. | 180/275 |
| 4,591,019 | 5/1986 | Fisher et al. | 180/275 |
| 4,633,968 | 1/1987 | Fisher et al. | 180/275 |
| 4,722,410 | 2/1988 | Melocik et al. | 303/20 X |
| 4,799,570 | 1/1989 | Andersson et al. | 180/275 |

FOREIGN PATENT DOCUMENTS

| | | | |
|---|---|---|---|
| 0070750 | 5/1982 | Japan | 180/275 |
| WO8601474 | 3/1986 | PCT Int'l Appl. | |
| 2173560 | 10/1986 | United Kingdom | 180/274 |

Primary Examiner—Duane A. Reger
Attorney, Agent, or Firm—Curtis, Morris & Safford

[57] ABSTRACT

The device senses the impact of a vehicle backing into an object, and automatically applies the brakes of an ordinary hydraulic brake system to stop the vehicle very quickly, before any significant damage can be done. The device uses a pneumatic cylinder to quickly and powerfully pull on the brake pedal of the vehicle when the vehicle is in reverse gear and an impact is sensed. A small, light-weight and relatively inexpensive air compressor which runs off of the battery of the vehicle and a reservoir are used to supply the air cylinder. The brakes stay in the actuated condition until the vehicle is taken out of reverse gear; then the air cylinder is vented to atmosphere automatically, and the brake pedal is released to return it to its initial position and enable the normal operation of the vehicle. The device can be supplied in the form of a kit to be used to easily modify existing vehicles without invading the hydraulic brake lines or vacuum system of the vehicle.

14 Claims, 3 Drawing Sheets

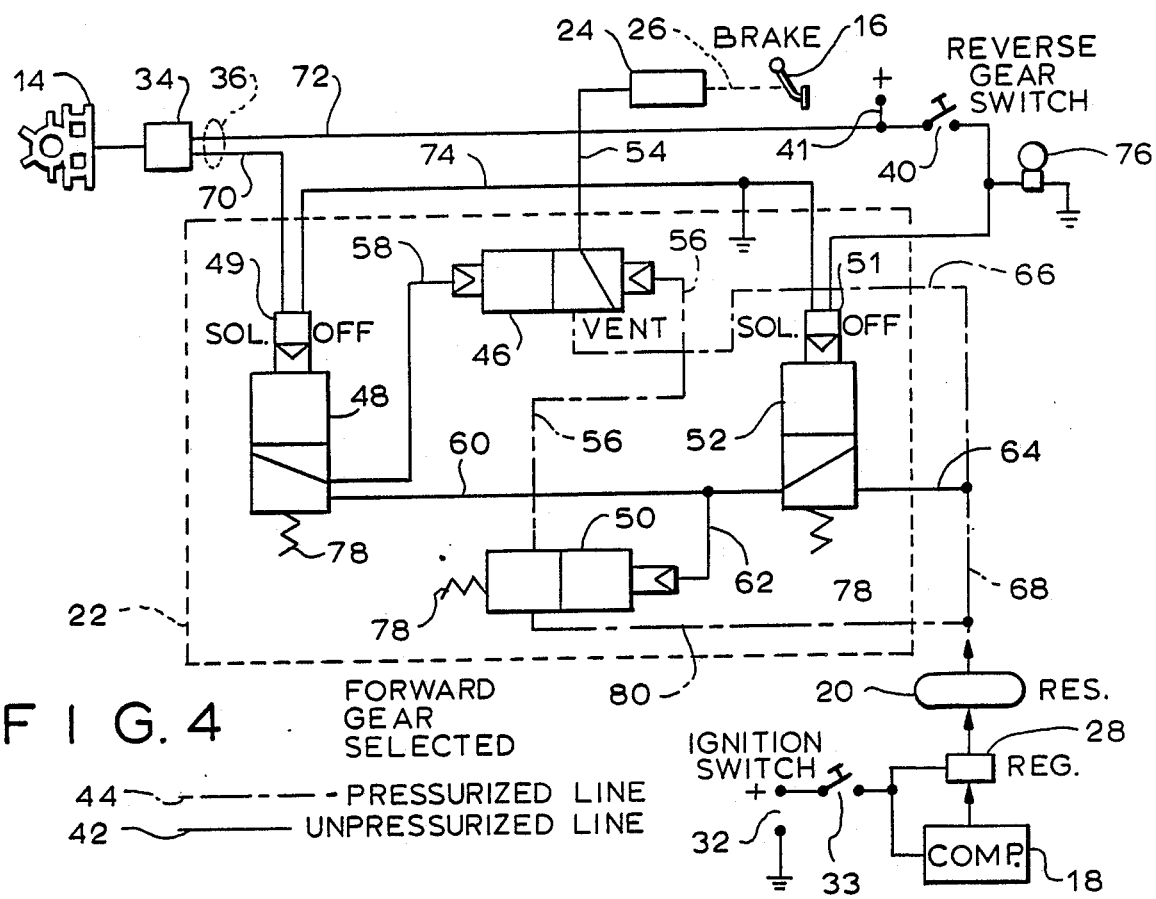
FIG. 4 — FORWARD GEAR SELECTED
44 — — — PRESSURIZED LINE
42 ———— UNPRESSURIZED LINE
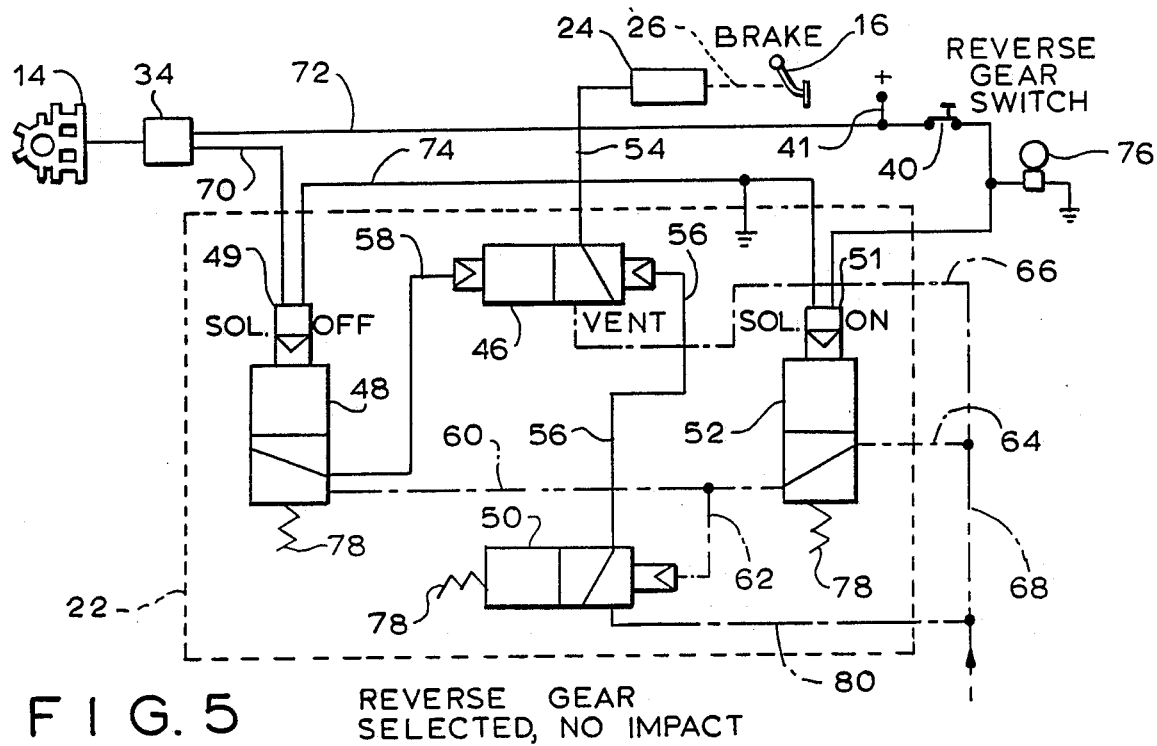
FIG. 5 — REVERSE GEAR SELECTED, NO IMPACT

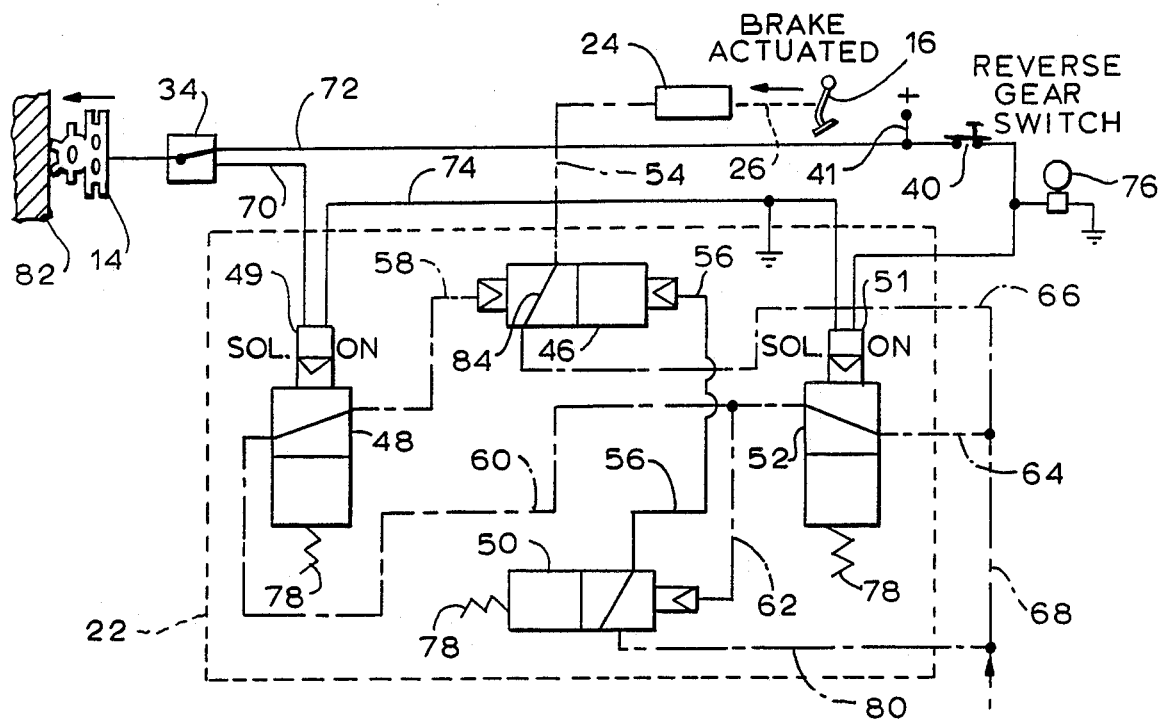
FIG. 6 REVERSE GEAR SELECTED AND IMPACT SENSED
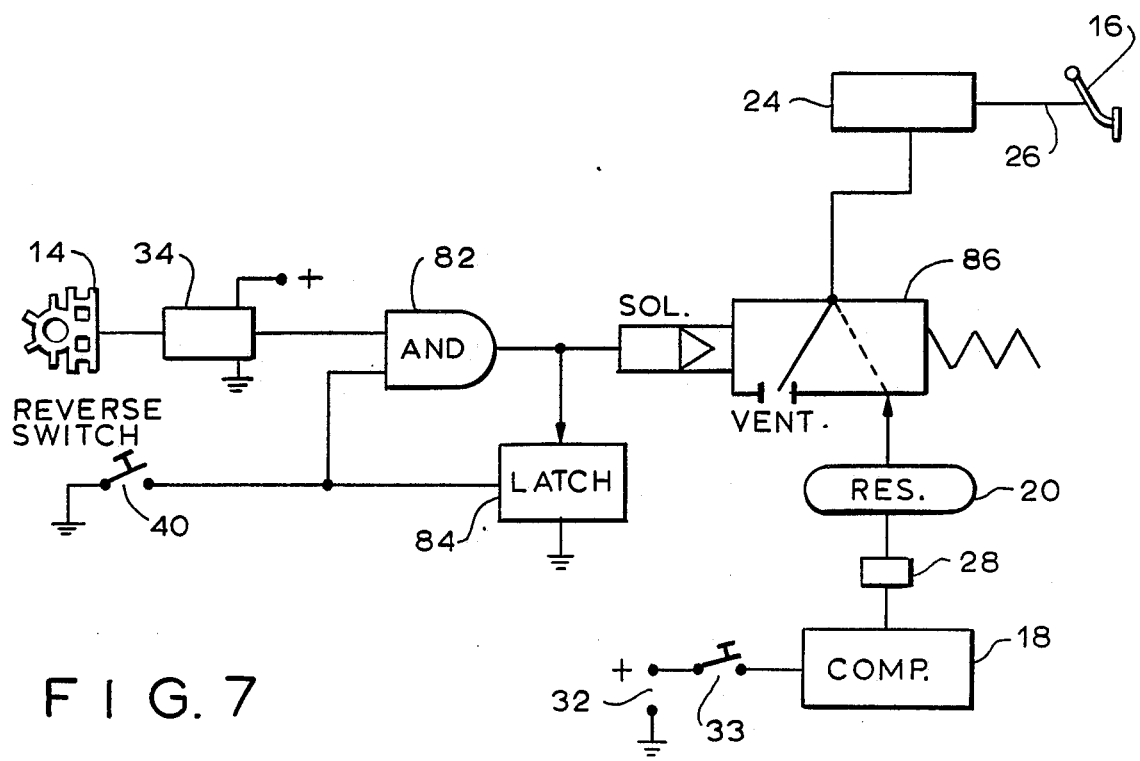
FIG. 7

BACK-UP SAFETY DEVICE AND METHOD

This invention relates to back-up safety devices and methods for vehicle, and particularly to devices and methods for automatically braking the vehicle upon detection of an incipient collision with an object at the rear of the vehicle.

It long has been a problem to avoid hitting a person or object when backing a motor vehicle. It is difficult for the driver to see what is behind the vehicle. This is especially true if the vehicle is a truck.

Accordingly, several approaches have been proposed for either warning the driver with an audible signal when the rear of his vehicle is approaching an object, or to automatically apply the brakes when nearness to or contact with the object is sensed. A device and braking system which performs this function very well is shown in U.S. Pat. Nos. 4,591,019 and 4,633,968. However, that device is designed for use with a vehicle having air brakes. Most automobiles and many vans and small trucks have hydraulic brakes. The provision of a practical automatic back-up safety device for use with a vehicle having hydraulic brakes has been difficult.

A device which is inserted directly in the hydraulic brake lines of the vehicle is not desirable because it is relatively expensive to manufacture and install. Furthermore, its installation in an existing vehicle requires breaching the integrity of the hydraulic system. This increases the chances of malfunction of the brakes.

The provision of a non-invasive safety device — that is, one which does not invade the hydraulic brake lines of the vehicle — has several advantages. Not only does it reduce the likelihood of malfunction of the brakes, but it also can be manufactured at a lower cost and can reduce the product liability insurance costs of the manufacturer.

Non-invasive back-up safety devices for vehicles with hydraulic brakes also have been proposed. However, those devices are believed to have been commercially unsuccessful because of inefficient or ineffective operation, excessive cost and complexity and/or due to excessive interconnection with the engine or other drive components of the vehicle, thus compromising the operation of such components, or the accessibility to such components for repairs. Moreover, at least some such devices did not lend themselves to low-cost mass production because each had to be specially constructed, at least in part, for each type or model of vehicle in use.

Accordingly, it is an object of the present invention to provide a vehicle back-up safety device and method in which the foregoing problems are alleviated or eliminated. Specifically, it is an object to provide such a device and method which is non-invasive, relatively economical to make and install, fast-acting and highly fail-safe in everyday use by vehicles with hydraulic brakes.

It also is an object of the invention to provide such a device which is relatively simple in construction and relatively compact so as to fit easily under the hood or elsewhere within a vehicle.

It is a further object of the invention to provide such a device and method which do not much depend upon the functions of the engine or vehicle components for operation, and whose construction can be largely standardized so as to enable relatively long production runs and maximize the cost-saving benefits of mass production.

In accordance with the present invention, there is provided an automatic back-up brake device and method for vehicles with hydraulic brakes. The device operates the vehicle brakes without invading the hydraulic system of the vehicle. The device uses a pressurized air-responsive actuating device, supplied with pressurized air from an electrically-driven compressor, together with detecting means for detecting the incipient collision or contact of the rear of the vehicle with an object behind the vehicle.

The mechanical connection of the actuating device to an existing brake component, such as the brake pedal of the vehicle, is relatively simple, as well as avoiding invasion of the vehicle's hydraulic system. The mechanism used to do this can be standardized to a substantial degree.

Similarly, the electrically-driven compressor is relatively easy to install, and can be largely standardized due to the fact that it only needs to be connected to the battery of the vehicle, and the characteristics of batteries and their connections are relatively uniform from one make and model of automobile or truck to another.

In a preferred embodiment, the actuating device used to apply the brakes is a pneumatic cylinder.

In a further aspect, the invention includes the provision of means for holding the brakes in the actuated condition as long as the vehicle is in reverse gear, and then upon the shifting of the vehicle out of reverse gear, venting the pneumatic cylinder to release the brakes. In another aspect of the invention, the operation of the device preferably is controlled by a pneumatic valve device - one which is reliable in operation and sturdy enough to endure the vibration and rough conditions under which the unit usually must operate.

The preferred embodiment uses a flexible hollow tube and a pressure-operated switch as a contact detector at the rear of the vehicle. Such a device is sturdy, reliable and relatively easy to standardize.

Another advantageous form of the invention comprises a kit for converting a conventional vehicle with a brake pedal to a back-up collision-protected vehicle. It is highly advantageous that the kit can be used with a wide variety of models and makes of vehicles, and is relatively simple to install.

Additional objects and advantages of the invention will be described in or apparent from the following description and drawings.

IN THE DRAWINGS

FIG. 4 is a schematic block diagram of the electrical and pneumatic control device of the present invention, with the device in a first condition of operation;

FIG. 5 is a view like that of FIG. 4, with the control device in a second condition of operation;

FIG. 6 is a schematic diagram, like that of FIGS. 4 and 5, with the control device in a third condition of operation; and FIG. 7 is a schematic diagram of an alternative embodiment of the control device.

GENERAL DESCRIPTION

Figure 1:
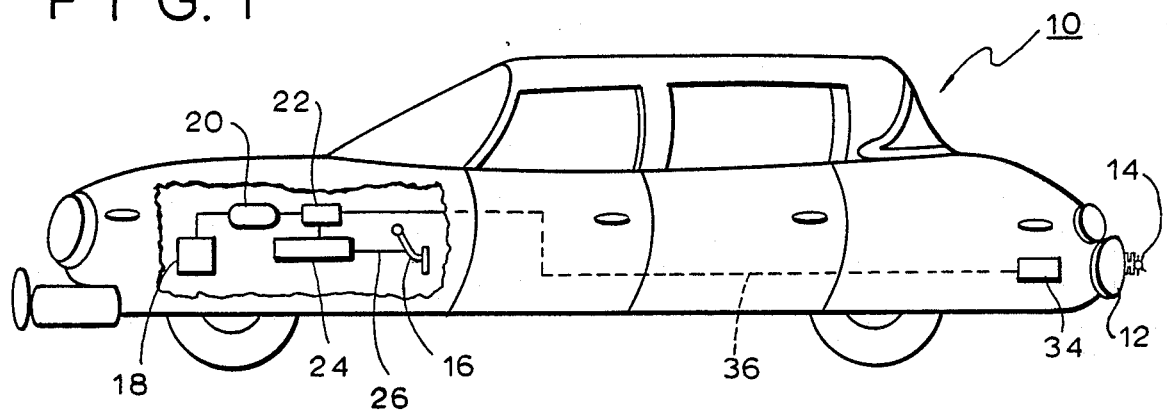
FIG. 1 is a partially broken-away, partially schematic view of a vehicle utilizing the present invention.

FIG. 1 shows an ordinary passenger sedan 10 which has been equipped with the safety device of the present invention. The safety device includes a contact sensor or detector 14 mounted on the rear bumper 12 of the automobile 10. As it is shown more clearly in FIG. 2, the sensor 14 is a sealed hollow rubber tube (also see FIG. 3) attached to the rear bumper 12 by means of a mounting plate 38 and bolts 39. When the rubber impact detector 14 strikes an object, it is distorted so that the air in the hollow interior is compressed. The change in pressure in the tube is sensed by a conventional pressure-sensitive switch 34 which is electrically connected by a wire or wires 36 to a control unit 22.

The vehicle 10 has a conventional hydraulic brake system including a brake pedal 16, a master cylinder 30, and individual cylinders at the wheels (not shown).

Attached by means of a cable 26 to the arm of the brake pedal 16 is a pneumatic cylinder 24 which, when actuated, pulls on the brake pedal of the car through the cable 26. This causes the brake to be operated as if someone had quickly depressed the brake pedal 16 with his or her foot. The master cylinder 30 is actuated and sends pressure signals to the brake cylinders at the four wheels of the vehicle to apply the brakes and stop the automobile.

Compressed air is supplied by means of a compressor 18 which is powered by the battery of the automobile as indicated at the terminals 32, when the ignition switch 33 of the vehicle is turned on. The pressure supplied by the compressor 18 is regulated by a conventional pressure regulator 28 and delivered to a reservoir 20. The pressurized air from the reservoir is delivered through the control unit 22 to the pneumatic cylinder 24, at the appropriate time, to pull the brake pedal 16 to the left to actuate the brakes.

Figure 2:
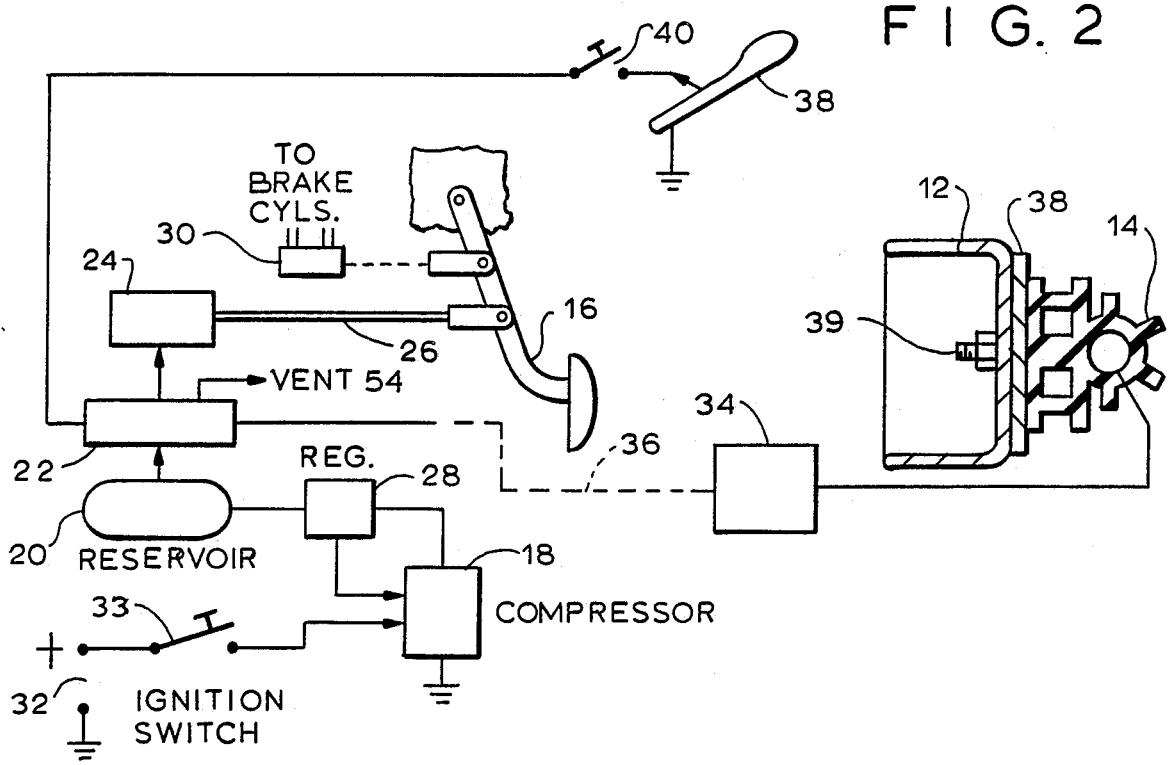
FIG. 2 is an enlarged schematic diagram of the automatic incipient collision detecting and braking system of the invention.

Still referring to FIG. 2, the gear selector lever 38 for the vehicle 10 is shown. It opens and closes a reverse gear light switch 40 when the gear shift lever is put into reverse gear. The switch 40 normally is provided on most automobiles in order to turn on the back-up lights.

Figure 3:
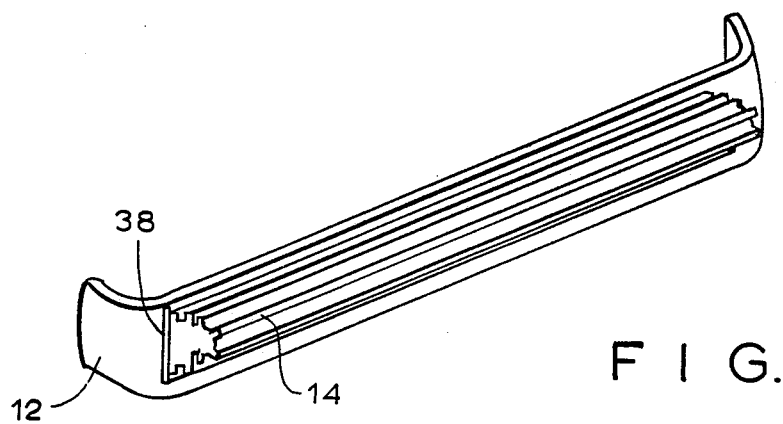
FIG. 3 is a perspective view of a rear bumper of the vehicle of FIG. 1, showing the incipient collision sensor.

The device shown in FIG. 1–3 operates to apply the hydraulic brakes of the vehicle very quickly, when a need therefor is indicated by the coincidence of the back-up light switch 40 being closed, and an object being sensed by the sensor After the brakes have been applied, they stay locked until the gear shift lever 38 is shifted out of reverse. Then, the air pressure applied to the cylinder 24 is vented through a vent 54 to release the brakes and prepare the device for another operation.

DETAILED DESCRIPTION

FIGS. 4 through 6 are schematic diagrams illustrating the operation of invention and showing schematically the details of the control unit 22.

FIG. 4 shows the condition of the system elements when the automobile 10 is in forward gear. FIG. 5 shows the same system after reverse gear has been selected, but no impact has been sensed by the sensor 14. FIG. 6 shows the same system when reverse gear has been selected, and an impact is sensed and the brakes are actuated.

Referring now to FIG. 4, the internal components of the control unit 22 include four pneumatic valves 46, 48, 50 and 52. The valves 48 and 52 are solenoid-operated valves. Valves 46 and 50 are shuttle valves. Each of the valves 48, 50 and 52 has a spring return, as indicated at 78. The shuttle valve 46 does not have a spring return.

Referring to the upper left-hand portion of FIG. 4, the pressure switch 34 is a conventional diaphragm-type device which senses sudden pressure changes in the sealed hollow interior of the rubber tube 14 and converts the change of pressure into motion which closes switch contacts to complete a circuit.

The switch 34 is connected in circuit with the reverse gear light switch 40 and the solenoids 49 and 51 of the solenoid valves 48 and 52, respectively. A lamp 76 is connected to light up to indicate when the reverse gear light switch is closed. Preferably, the lamp 76 is located on the dashboard of the automobile 10.

When the lamp 76 does not light despite shifting of the automobile into reverse gear, or when it stays on when the vehicle is not in reverse gear, the lamp indicates possible trouble which needs attention. The circuit is connected at 41 to the positive terminal of the car battery, and the line 74 is grounded to complete the circuit.

Referring now to the lower right-hand portion of FIG. 4, when the ignition switch 33 of the automobile is closed, the compressor 18 starts and supplies compressed air to the reservoir 20 through the pressure regulator 28. When the pressure in the reservoir has reached a predetermined value, the regulator turns off the compressor. The reservoir 20 is relatively small, having a capacity of only about 30 cubic inches. Thus, the compressor 18 also can be relatively small and inexpensive, and will not overly tax the alternator and battery of the automobile.

In the lower left-hand portion of FIG. 4 is a legend showing the symbols used for pressurized and unpressurized lines. The long dashed lines 44 indicate pressurized lines, and the solid lines 42 represent unpressurized lines.

The pressurized line 68 from the reservoir 20 is connected to the control valves in the unit 22 through lines 64, 66 and 80. Line 66 is connected to one port of the shuttle valve 46. The line 64 is connected to one port of the valve 52, and the line 80 is connected to one port of the valve 50, and, through an outlet port from valve 50 to an input port at the right end of shuttle valve 46. This positive pressure holds that valve in the position shown in FIG. 4. In this position, the line 54 to the air cylinder 24 is vented to atmosphere and the brake pedal 16 is unactuated.

The valve 46 will not change until the pressurized air on line 56 is removed from the right end, and pressurized air is applied through line 58 at the other end. In the condition shown in FIG. 4, the line 58 connecting the left end of valve 46 to one port of the valve 48 is vented to atmosphere. A line 60 interconnects valves 48 and 52, and also is vented to atmosphere, as is the line 62 which is connected to the right side of valve 50. Neither of the solenoid valves 50 and 51 is energized.

The requirement of the occurrence of two different events in order to operate the shuttle valve 46 to pressurize the pneumatic cylinder 24 provides a measure of safety against unwanted actuation of the brakes.

Referring now to FIG. 5, when reverse gear is selected, the reverse gear light switch 40 closes. This turns on the solenoid 51 of the solenoid valve 52. The operation of valve 52 causes pressurized air to be supplied through lines 60 and 62 to the valves 48 and 50.

The operation of valve 50 removes pressure from the line 56. However, since there still is no pressure applied on line 58 for valve 46, valve 46 remains in its previous position. The solenoid 49 is still unenergized and the air cylinder 24 is still vented to atmosphere.

Referring now to FIG. 6, when the reverse gear switch 40 is closed and an impact with some object 82 is sensed by a change of pressure in the tube 14, the pressure switch 34 is closed. This completes the electrical circuit to the solenoid 49 of the valve 48, and applies pressure from the line 60 to the line 58. This causes the valve 46 to shuttle and connect the line 54 to the high pressure air source. This causes the pneumatic cylinder 24 to pull on the cable 26 to pull the brake pedal 16 to actuate the brakes and stop the vehicle.

The brakes are latched or locked in the actuated condition until the reverse gear light switch 40 is opened again by taking the vehicle out of reverse gear. This prevents the vehicle from being backed into the object 82 to create damage.

When the vehicle is shifted from reverse gear to a forward gear or neutral, the valves return to the condition shown in FIG. 4. The opening of the switch 40 turns off the solenoids 49 and 51 so that the valves 48 and 52 return to their initial condition, as does the valve 50. Positive pressure is applied to the right-hand side of the shuttle valve 46 to open the air cylinder line 54 to atmosphere and vent the pressure. This releases the brakes and readies the system for another operation.

The control unit 22 is very advantageous in that it is relatively compact, and stands up well to the vibration and other rigors of vehicular transportation.

The pressure switch 34 preferably has a needle valve to vent it to atmosphere. Adjustment of the needle valve will allow for long-term pressure changes due to changing atmospheric temperatures, but will allow the device to sense the sudden pressure changes created by an impact. The device 34 typically is, for example, a Herga brand model 132B pressure switch.

A compressor which has been used successfully in a safety device using the present invention, is a small positive-displacement pump producing output pressures of 50 to 100 p.s.i., the actual pressure depending on the needs of the pneumatic cylinder and the setting of the pressure regulator. The compressor operates on 12 volts D.C. The pump operates for only about 10 to 30 seconds to fill the reservoir 20, when it is completely empty at the start. Usually, only a very few seconds of operation is needed every so often to replace air lost due to leakage.

As noted above, the safety device of the invention can be sold as a conversion kit. The kit includes the compressor 18, regulator 28, reservoir 20, control unit 22, pneumatic cylinder 24, cable 26, sensor 14 and switch 34, together with a housing on mounting brackets (not shown), and installation instructions. Only a relatively few modifications need be made to adapt the kit for different makes of vehicle. Thus, back-up safety can be widely distributed at a relatively modest cost.

ALTERNATIVE EMBODIMENTS

It should be understood that the scope of the invention is not limited to the preferred embodiment described above. For example, although the multiple-valve control device 22 is preferred, the same function can be provided by a variety of other devices. For example, a single valve performing the functions of the valve 46 can be used together with an electrical relay circuit to connect the pneumatic cylinder to the compressed air supply only when both the reverse light switch and impact detector switch are closed; maintain the connection until the reverse light switch is opened against; and disconnect the cylinder from the compressed gas supply, and vent the cylinder to atmosphere to release the brakes when the reverse light switch is opened.

Another alternative which uses solid-state electronic logic circuits to control the actuation of the pneumatic cylinder is shown in FIG. 7. An AND gate 82 is connected to control the single valve 86 to connect the pneumatic cylinder 24 to the compressed air supply 18, 20 only when the AND gate receives signals from the reverse gear light switch 40 and the collision detector 34 simultaneously. A latch circuit 84 is turned on by the output of the AND gate and maintains the signal input to the valve 86 until the latch circuit receives a negative-going signal due to the opening of the reverse gear switch 40, even though the signal from the detector 34 no longer exists. When the reverse gear switch 40 is opened by shifting the vehicle into another gear, the valve 86 reverts to its original state and disconnects the pneumatic cylinder 24 from the compressed air supply and vents the cylinder to atmosphere.

Incipient collision detectors other than the detector 14 and pressure switch 34 also can be used. For example, known ultrasonic and light beam devices can be used to detect an incipient collision and signal the pneumatic, relay or solid state electronic control devices accordingly. As it is made evident by the foregoing, as the term is used herein, an "incipient collision" can be detected either before any contact is made, or after initial contact has been made, but little or no damage has been done.

Not only does the invention help improve the quality of life due to the reduction of injury and financial loss to accident victims, but it also is economically significant in reducing accident claims against insurance companies and self-insuring businesses. This reduces the cost of doing business, as well as the overall level of human suffering.

I claim:

1. An automatic back-up brake device for vehicles with hydraulic brakes, said device comprising, in combination, a vehicle with a hydraulic brake system having an actuating member movable to apply the brakes to stop said vehicle, pneumatic means for selectively actuating said actuating member to apply said brakes to said vehicle, an electrically driven compressor, a compressed air reservoir connected to the outlet of said compressor regulator means, control means for energizing said compressor only when the need therefor is sensed by said regulator means, detecting means for detecting an object with which a collision could occur at the rear of said vehicle, and actuating valve means responsive to said detecting means for conducting pressurized air to said pneumatic means from said reservoir to apply said brakes to stop said vehicle.

2. A device as in claim 1 in which said actuating valve means has a movable valve member movable in a valve body to a first position in which it vents said pneumatic means to atmosphere, and a second position at which it connects said pneumatic means to said reservoir, and safety means for using compressed air from said reservoir to hold said valve member in said first position which said vehicle is being driven in a forward direction, and driving means for driving said movable member to said second position in response to the detection of a collision by said detector.

3. A device as in claim 2, in which said actuating valve means includes pre-conditioning means responsive to the shifting of the vehicle into reverse gear to disable said safety means and enable said driving means to connect said pneumatic means to said reservoir when a collision is detected.

4. A device as in claim 1, in which said pre-conditioning means includes a first solenoid valve means actuable to disable said safety means and enable said driving means, and said driving means includes a second solenoid-actuated valve to connect said pneumatic means to said reservoir.

5. A device as in claim 3, in which said pre-conditioning means is disabled upon shifting of said vehicle out of reverse gear, thereby enabling said safety means and venting said pneumatic means to atmosphere.

6. A safety device kit for back-up collision protection in vehicles having brake-actuating levers, said device comprising the combination of rear collision detector means mountable at the rear of a vehicle to generate signal upon the detection of an incipient collision, pneumatic actuating means mountable in said vehicle and responsive to pressurized air to move the brake-actuating lever of a vehicle to apply the brakes of said vehicle, electrically powered compressed air supply means mountable in said vehicle and adapted to be connected to and operated by the battery of a vehicle in which it is installed, control means mountable in said vehicle and adapted for applying compressed air to said pneumatic actuating means to apply said brakes when reverse gear of the vehicle has been selected and said collision detector generates a signal, and for ending the supply of compressed air to and venting said pneumatic actuating means to release said brakes when a gear in said vehicle other than reverse is selected, said compressed air supply means including a compressor, a reservoir and air pressure regulator means for controlling the operation of said compressor.

7. A device as in claim 6 in which said brakes are hydraulic brakes, and said brake-actuating lever is a brake pedal.

8. A device as in claim 6 in which said control means includes a pneumatic valve for alternatingly connecting said pneumatic cylinder to said compressed air supply or to atmosphere, to actuate or release said brakes, respectively.

9. A device as in claim 8 including logic means for causing said valve to connect said cylinder to said compressed air supply upon the coincidence of the vehicle being in reverse gear and said collision detector producing a signal, latch means for causing said valve to maintain the connection of said compressed air supply after said signal from said detector means ceases but reverse gear still is selected, said logic means being adapted to cause said valve to disconnect said cylinder from said compressed gas supply and vent said cylinder to atmosphere.

10. A method of modifying a vehicle with hydraulic brakes to give it protection against back-up collisions without intrusion into the hydraulic brake lines, said method comprising the steps of providing rear collision detector means mountable at the rear of a vehicle to generate a signal upon the detection of an incipient collision, pneumatic actuating means mountable in said vehicle and responsive to pressurized air to move the brake-actuating lever of a vehicle to apply the brakes of said vehicle, electrically powered compressed air supply means including a compressor, a reservoir, and a regulator for controlling the operation of said compressor, said air supply means being mountable in said vehicle and adapted to be connected to and operated by the battery of a vehicle in which it is installed, and control means mountable in said vehicle and adapted for applying compressed air to said pneumatic actuating means to apply said brakes when reverse gear of the vehicle has been selected and said collision detector generates a signal, and for ending the supply of compressed air to and venting said pneumatic actuating means to release said brakes when a gear in said vehicle other than reverse is selected, mounting said detector means on the rear of said vehicle, mounting said compressed air supply means in said vehicle and connecting it to the battery of said vehicle, mounting and electrically connecting said control means in said vehicle and mounting said pneumatic actuating means in said vehicle and drivably coupling it to the brake pedal of said vehicle.

11. A method as in claim 10, said electrically connecting step including connecting said control means to said detector means and to the reverse gear light switch of the vehicle.

12. A safety device for back-up collision protection in vehicles having brake-actuating levers, said device comprising the combination of rear collision detector means mountable t the rear of a vehicle to generate a signal upon the detection of an incipient collision, pneumatic actuating means mountable in said vehicle and responsive to pressurized air to move the brake-actuating lever of a vehicle to apply the brakes of said vehicle, electrically powered compressed air supply means mountable in said vehicle and adapted to be connected to an operated by the battery of a vehicle in which it is installed, said air supply means including a compressor, a reservoir and a regulator, and control means mountable in said vehicle and adapted for applying compressed air to said pneumatic actuating means to apply said brakes when reverse gear of the vehicle has been selected and said collision detector generates a signal, and for ending the supply of compressed air to and venting said pneumatic actuating means to release said brakes when a gear in said vehicle other than reverse is selected and in which said control means includes a pneumatic valve for alternatingly connecting said pneumatic cylinder to said compressed air supply or to atmosphere, to actuate or release said brakes respectively, logic means for causing said valve to connect said cylinder to said compressed air supply upon the coincidence of the vehicle being in reverse gear and said collision detector producing a signal, latch means for causing said valve to maintain the connection of said compressed air supply after said signal from said detector means ceases but reverse gear still is selected, said logic means adapted to cause said valve to disconnect said cylinder from said compressed gas supply and vent said cylinder to atmosphere, said logic means including a solid-state AND gate and a solid-state latch circuit, said AND gate being connected to receive input signals from the reverse light switch and said detector, and said latch being controlled by said reverse light switch to hold the connection of the pneumatic cylinder to the compressed air source until the reverse light switch is opened.

13. A backup collision damage protection device, said device comprising, in combination detecting means for detecting an incipient collision between the rear of a vehicle and an object behind said vehicle and producing a corresponding electrical signal, reverse gear signal means for producing an electrical signal indicating that the vehicle is in reverse gear, pneumatic drive means, coupling means for coupling said drive means to an operative lever of the brake system of said vehicle, pressurized air supply means comprising an electrically operated compressor, electrically-operated valve means for alternatively connecting said drive means to said supply means or to atmosphere, electronic AND gate means for receiving signals from said detecting and reverse gear signal means and operating said valve to connect said drive means to said air supply means, and latch circuit means enabled by said AND gate means and said reverse gear signal means to maintain the connection of said drive means with said air supply until said reverse gear signal means indicates said vehicle has been shifted out of reverse gear.

14. A device as in claim 13 in which said vehicle has a hydraulic brake system and said lever is the brake pedal of said vehicle.

* * * * *